No. 668,056. Patented Feb. 12, 1901.
M. E. SHANE.
BICYCLE SADDLE.
(Application filed Sept. 14, 1899. Renewed Dec. 27, 1900.)
(No Model.)
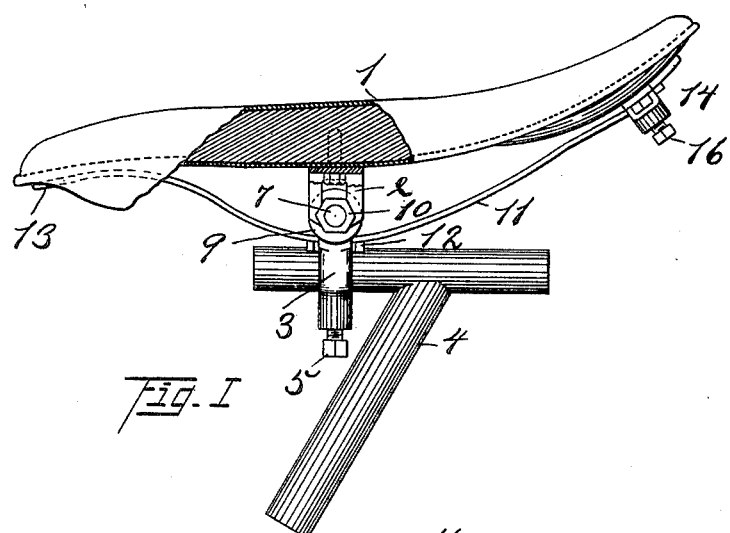
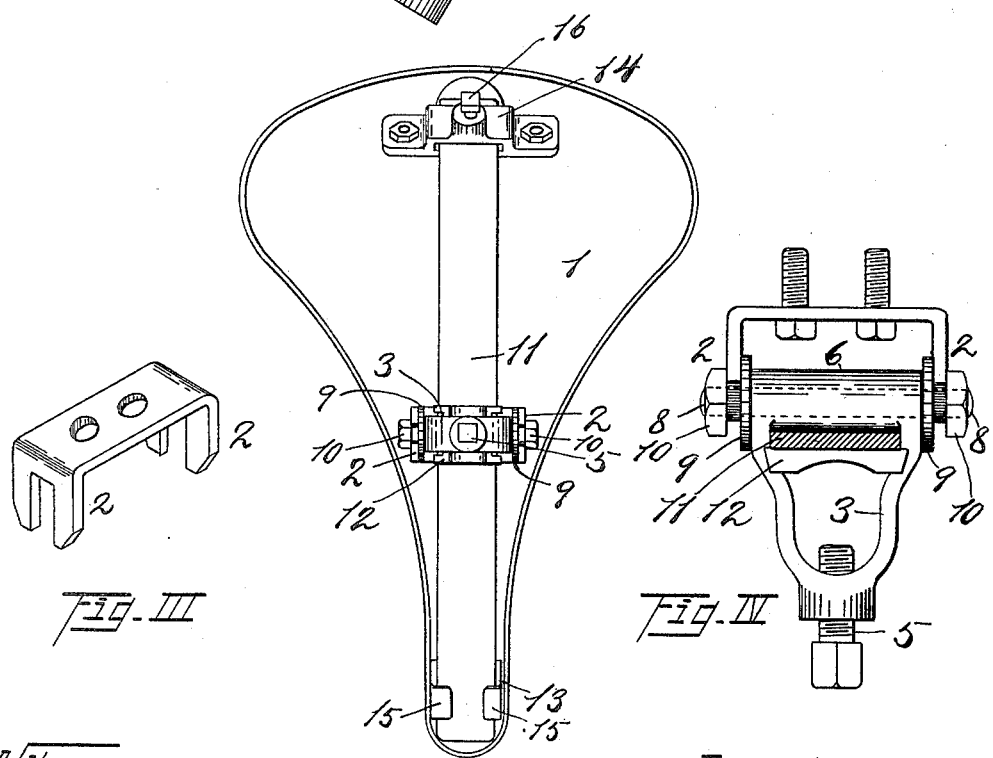
Witnesses:
Inventor—
M. E. Shane,

UNITED STATES PATENT OFFICE.

MILTON E. SHANE, OF CLEVELAND, OHIO.

BICYCLE-SADDLE.

SPECIFICATION forming part of Letters Patent No. 668,056, dated February 12, 1901.

Application filed September 14, 1899. Renewed December 27, 1900. Serial No. 41,296. (No model.)

*To all whom it may concern:*

Be it known that I, MILTON E. SHANE, a citizen of the United States, and a resident of Cleveland, county of Cuyahoga, and State of Ohio, have invented certain new and useful Improvements in Bicycle-Saddles, of which the following is a specification, the principle of the invention being herein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents a sectional view of a bicycle-saddle, showing my improved saddle-support in side elevation; Fig. II, a bottom plan view of the saddle and support; Fig. III, a detail view of the ears upon the under side of the saddle, and Fig. IV a detail view of the clip for the support.

The saddle 1 is of the usual or any desired construction and has two longitudinally-slotted or forked ears 2 secured to the middle of its under side. A clip 3 is constructed to fit upon the head of the seat-post 4 and to be secured upon the same, for instance, by a set-screw 5. The upper side of said clip is formed with a pintle-bearing 6, through which a pintle 7 is inserted and snugly fits to rock in the bearing. Said pintle has ends 8, which project beyond the bearing and which are screw-threaded, and said ends have collars 9 fitted upon them at the inner ends of the screw-threads and bearing against the ends of the bearing. The slotted ears upon the saddle fit over the screw-threaded ends of the pintle and are clamped against the collars upon the same by means of nuts 10 upon said threaded ends, so that the saddle has a rocking pivotal fulcrum upon the pintle. A flat-spring 11, curved upward at both ends, is clamped at its middle in the clip by a block 12 in the same, when the clip is clamped upon the head of the seat-post, and the ends of said spring have sliding movement in guides 13 and 14 at the pommel and cantle of the saddle. The guide 13 at the pommel of the saddle is in the present case illustrated as composed of a plate bent to form two lips 15, confining the spring, and the guide 14 is illustrated as a loop or box having a set-screw 16 for securing the end of the spring. Both guides may be of the same construction.

When the seat is clamped upon the head of the seat-post, the saddle will have rocking motion upon the pintle, and the spring being confined at its middle and yieldingly supporting the ends of the saddle such rocking motion will be cushioned and limited by the spring. This cushioned movement of the saddle will render riding easy over rough ground, as the longitudinal rocking motion of the bicycle as the wheels successively pass over obstructions will be thoroughly cushioned. Each half of the spring acts as an independent spring-support for that end of the saddle. When it is desired to have more rigid support for the saddle, the end of the spring may be secured in the guide by the set-screw, when the spring will be nearly rigid and the rocking motion of the saddle will be practically stopped. The vertical movement of a saddle simply supported by springs and without the pivotal support provided by the pintle in the present invention will cause the rider to be shaken up and down if the springs give sufficient play for the saddle to yield, or the seat will fail to be relieved from shocks caused by obstructions in the road if the supporting spring or springs are sufficiently strong to prevent the bobbing movement of the saddle.

Other modes of applying the principle of my invention may be employed for the mode herein explained. Change may therefore be made as regards the mechanism thus disclosed, provided the principles of construction set forth respectively in the following claim are employed.

I therefore particularly point out and distinctly claim as my invention—

The combination of the saddle-clip 3 having the pintle-bearing 6, the pintle 7 having collars 9 and nuts 10 upon its threaded ends 8, the saddle 1, the forked ears 2, the guide 13, the guide 14 having set-screw 16, and the flat spring 11, substantially as set forth.

In testimony that I claim the foregoing to be my invention I have hereunto set my hand this 11th day of September, A. D. 1899.

MILTON E. SHANE.

Witnesses:
WM. SECHER,
K. F. WINDING.